(12) United States Patent
Mueck et al.

(10) Patent No.: US 10,044,537 B2
(45) Date of Patent: Aug. 7, 2018

(54) FREQUENCY DOMAIN PULSE POSITION MODULATION

(71) Applicant: Intel IP Corporation, Santa Clara, CA (US)

(72) Inventors: Marcus Dominik Mueck, Neubiberg (DE); Ingolf Karls, Feldkirchen (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/393,109

(22) Filed: Dec. 28, 2016

(65) Prior Publication Data
US 2018/0183639 A1     Jun. 28, 2018

(51) Int. Cl.
| | |
|---|---|
| *H04L 27/28* | (2006.01) |
| *H04L 27/12* | (2006.01) |
| *H04L 12/931* | (2013.01) |
| *H04L 27/26* | (2006.01) |

(52) U.S. Cl.
CPC .......... *H04L 27/12* (2013.01); *H04L 27/2614* (2013.01); *H04L 49/205* (2013.01)

(58) Field of Classification Search
CPC .... H04L 27/12; H04L 49/205; H04L 27/2614
See application file for complete search history.

(56) References Cited

U.S. PATENT DOCUMENTS

| | | | | |
|---|---|---|---|---|
| 8,811,973 B2* | 8/2014 | Vijayan | ................. | H04L 5/0007 370/329 |
| 8,995,538 B2* | 3/2015 | Lim | ...................... | H04L 1/0026 375/260 |
| 2005/0002463 A1* | 1/2005 | Sakamoto | ........... | H04L 27/2602 375/260 |
| 2005/0213405 A1 | 9/2005 | Stapler | | |
| 2006/0140296 A1* | 6/2006 | Cleveland | ........... | H04L 27/2618 375/260 |
| 2010/0189093 A1 | 7/2010 | Palanki et al. | | |
| 2012/0275540 A1* | 11/2012 | Ozluturk | ............... | H04L 5/0025 375/295 |
| 2014/0269770 A1 | 9/2014 | Kenny et al. | | |
| 2015/0055611 A1 | 2/2015 | Ji et al. | | |
| 2015/0295676 A1 | 10/2015 | Kenney et al. | | |

OTHER PUBLICATIONS

International Search Report and Written Opinion dated Apr. 10, 2018, on application No. PCT/US2017/067700.

* cited by examiner

*Primary Examiner* — Dac Ha
(74) *Attorney, Agent, or Firm* — Lowenstein Sandler LLP (57) ABSTRACT

An apparatus of a wireless device has a storage element to store data from a first data stream and a second data stream and a processing component operatively coupled to the storage element. The processing component selects a first set of data from the first data stream to be transmitted and determines one or more subcarriers of a plurality of available subcarriers to transmit at a first power level to represent the first set of data. The processing component also selects a second set of data from the second data stream and encodes the second set of data at a second power level on a set of remaining subcarriers that are not to be transmitted at the first power level. The processing component may then generate a symbol to be transmitted comprising the plurality of subcarriers.

15 Claims, 8 Drawing Sheets

FREQUENCY DOMAIN PULSE POSITION MODULATION

BACKGROUND

The disclosure relates to the field of mobile communications, including encoding schemes for transmitting and receiving data over a wireless communication channel.

BRIEF DESCRIPTION OF THE DRAWINGS

Various implementations of the present disclosure will be understood more fully from the detailed description given below and from the accompanying drawings of various exemplary implementations of the disclosure.

DETAILED DESCRIPTION

Wireless communication has brought substantial improvements to various aspects of our daily lives from health to scientific research, from education to entertainment, etc., not only due to a large amount of data or a vast range of contents being communicated, but also due to the lack of physical connection. As wireless communication technology improves, mobile devices such as smart phones and tablets have become increasingly popular, which causes the radio spectrum usage to be exponentially congested. As a result, there is a desire for effective and efficient spectrum allocations. With an advent of the new rules for millimeter Wave (mmWave) spectrum usage in the United States, for example, with respect to the 28, 37, and 39 GHz bands, provided by the Federal Communications Commission (FCC) in 2016, new doors to innovation for mmWave-based wireless communication have opened up. Though the FCC still imposes a maximum limit for spectral power density for Base Stations (e.g., devices having an average equivalent isotropically radiated power (EIRP) of 75 dBm/100 MHz or less), such maximum limit for spectral power density is no longer required for Mobile Stations (e.g., devices having 43 dBm maximum EIRP and transportable Customer Premises Equipment (CPE), such as mobile phones or tablets, having 55 dBm maximum EIRP.

In mmWave systems, the signal-to-interference-plus-noise ratio (SINR) conditions are critical factors in establishing good and functional line-of-sight (LOS) links because SINR can drop abruptly and substantially in less than favorable conditions such as in non-line of sight (NLOS) propagation environments. To resolve this issue, it is necessary to have a type of modulation that can effectively and swiftly adapt to communication link changes by taking advantage of the FCC-2016 spectral power density regulations. In other words, favorable or desirable communication links can have reliable and spectrum-efficient high throughput, while simultaneously and/or concurrently, less favorable or desirable communication links can still be used to maintain and/or convey information at a basic data flow in a reliable and spectrum-efficient manner.

In some exemplary implementations, power hierarchical modulation may use a high-power peak in frequency domain to encode data for transmission. The frequency domain position of the high-power peak may carry the data and/or information in combination—simultaneously and/or concurrently—with a lower power modulation signal for the rest of the carriers. The modulation may provide one subcarrier at a higher power level than other subcarriers to represent a set of data. For example, if there is a set of available subcarriers, one subcarrier from the set may be selected to represent a set of data. In a simple example having two subcarriers, selecting the first subcarrier to be transmitted at a higher power level than the second subcarrier may indicate the bit '0' while selecting the second subcarrier to be transmitted at a higher power level than the first subcarrier may indicate the bit '1'. In practical examples, the number of available subcarriers may be much larger, and the number of bits represented by transmitting one subcarrier at a higher power level may also be larger. For example, if there are four available subcarriers, selecting one subcarrier to transmit at a higher power level may convey two bits of information. Additional available subcarriers may similarly increase the bits transmitted.

Furthermore, in some exemplary implementations, a mobile device may transmit more than one available subcarrier at a higher power level. For example, the mobile device may transmit two or more subcarriers at a higher power level. Accordingly, additional data may be transmitted based on the number of available subcarriers and the number of selected subcarriers to be transmitted at a higher level.

This type of modulation is reliable, scalable, power and spectrum efficient, and also can quickly adapt to changing environments. The proposed solution would not have been feasible under the previous regulation conditions—i.e., prior to FCC-2016—which affect bands in 6 GHz or lower because of the imposed maximum spectral power density. The spectrum mask was flat in the in-band area, so devices may have been either able to receive and transmit the entire signal or a receiver of the signal may not have received any data at a quality that could be decoded. However, due to the fact that there is no longer maximum spectral power density mandate for Mobile Stations, the receivers, transmitters, and transceivers can operate in less favorable conditions such as NLOS with a reliable basic data flow, while the receivers, transmitters, and transceivers in good and favorable conditions such as LOS are also able to obtain the high throughput data as well as the lower power data, simultaneously and/or concurrently. While the pulsed position phase modulation described herein is discussed with reference to mobile devices as transmitters and base stations as receivers, a base station could similarly transmit data using pulsed phase position modulation and a mobile device could receive the signal. Furthermore, while described herein in the context of mobile wireless communications, in some exemplary implementations, such pulsed position modulation could be performed over wired connections, between two base stations, or in other contexts involving the transmission of data.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed disclosure. However, various aspects of the disclosed exemplary implementations may be practiced in other examples that depart from these specific details. In certain instances, descriptions of well-known devices, circuits, and methods are omitted so as not to obscure the description of the present disclosure with unnecessary detail.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some exemplary implementations, the circuitry may be implemented in, or functions associated with the circuitry may be implemented by, one or more software or firmware modules. In some exemplary implementations, circuitry may include logic, at least partially operable in hardware.

Figure 1:
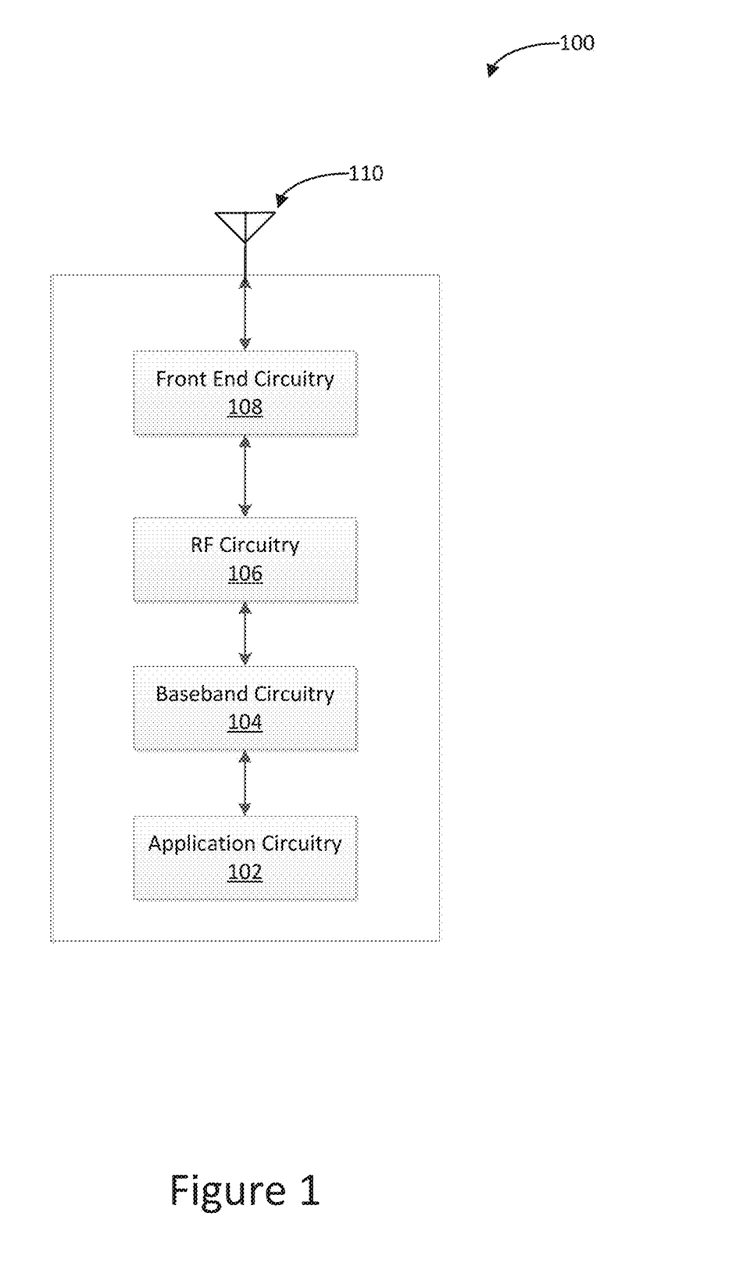
FIG. 1 illustrates a block diagram of an exemplary user equipment (UE) that includes application circuitry, baseband circuitry, radio frequency (RF) circuitry, Front End Circuitry, and one or more antennas according to an exemplary implementation.

Exemplary implementations described herein may be implemented into a system using any suitably configured hardware and/or software. FIG. 1 illustrates, for one exemplary implementation, a block diagram of example components of a wireless device 100. In some exemplary implementations, the wireless device 100 may include application circuitry 102, baseband circuitry 104, radio frequency (RF) circuitry 106, front-end circuitry 108, and one or more antennas 110, coupled together at least as shown.

As used herein, the term "circuitry" may refer to, be part of, or include an Application Specific Integrated Circuit (ASIC), an electronic circuit, a processing component (e.g., shared, dedicated, or group), and/or a storage element (e.g., shared, dedicated, or group memory) that execute one or more software or firmware programs, a combinational logic circuit, and/or other suitable hardware components that provide the described functionality. In some exemplary implementations, the circuitry may be implemented in, or functions associated with the circuitry may be implemented by, one or more software or firmware modules. In some exemplary implementations, circuitry may include logic, at least partially operable in hardware.

In the wireless device 100, the application circuitry 102 may include one or more application processing components. For example, the application circuitry 102 may include circuitry such as, but not limited to, one or more single-core or multi-core processors. The processor(s) may include any combination of general-purpose processors and dedicated processors (e.g., graphics processors, application processors, etc.). The processing components may be coupled with and/or may include memory/storage element and may be configured to execute instructions stored in the memory/storage element to enable various applications and/or operating systems to run on the system.

The baseband circuitry 104 may include circuitry such as, but not limited to, one or more single-core or multi-core processors. The baseband circuitry 104 may include one or more baseband processing components and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some exemplary implementations, the baseband circuitry 104 may include a second generation (2G) baseband processor, a third generation (3G) baseband processor, a fourth generation (4G) baseband processor, and/or other baseband processor(s) for other existing generations, generations in development, or to be developed in the future (e.g., fifth generation (5G), 6G, or the like). The baseband circuitry 104 may handle various radio control functions that enable communication with one or more radio networks via the RF circuitry 106. The radio control functions may include, but are not limited to, signal modulation/demodulation, encoding/decoding, radio frequency shifting, etc.

In some exemplary implementations, modulation/demodulation circuitry of the baseband circuitry 104 may include Fast-Fourier Transform (FFT), preceding, and/or constellation mapping/demapping functionality. In some exemplary implementations, encoding/decoding circuitry of the baseband circuitry 104 may include convolution, tail-biting convolution, turbo, Viterbi, and/or Low Density Parity Check (LDPC) encoder/decoder functionality. Exemplary implementations of modulation/demodulation and encoder/decoder functionality are not limited to these examples and may include other suitable functionality in other exemplary implementations.

In some exemplary implementations, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) of the baseband circuitry 104 may be configured to run elements of the protocol stack for signaling of the PHY, MAC, RLC, PDCP, NAS, and/or RRC layers. In some exemplary implementations, the baseband circuitry may include one or more audio digital signal processor(s) (DSP). The audio DSP(s) may include elements for compression/decompression and echo cancellation and may include other suitable processing components in other exemplary implementations. Components of the baseband circuitry may be suitably combined in a single chip, a single chipset, or disposed on a same circuit board in some exemplary implementations. In some exemplary implementations, some or all of the constituent components of the baseband circuitry 104 and the application circuitry 102 may be implemented together such as, for example, on a system on a chip (SoC).

In some exemplary implementations, the baseband circuitry 104 may provide for communication compatible with one or more radio technologies. For example, in some exemplary implementations, the baseband circuitry 104 may support communication with an evolved universal terrestrial radio access network (EUTRAN) and/or other wireless metropolitan area networks (WMAN), a wireless local area network (WLAN), a wireless personal area network (WPAN). Exemplary implementations in which the baseband circuitry 104 is configured to support radio communications of more than one wireless protocol may be referred to as multi-mode baseband circuitry.

In various implementations, the baseband circuitry 104 may operate according to one or more standards including Global System for Mobile Communications (GSM) radio communication technology, General Packet Radio Service (GPRS) radio communication technology, Enhanced Data Rates for GSM Evolution (EDGE) radio communication technology, or Third Generation Partnership Project (3GPP) radio communication technology. 3GPP communication technologies may include Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network (GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and the like.

The baseband circuitry 104 may further operate according to one or more spectrum management schemes including dedicated licensed spectrum, unlicensed spectrum, or (licensed) shared spectrum. Licensed shared spectrum may include Licensed Shared Access (LSA) in 2.3-2.4 GHz, 3.4-3.6 GHz, 3.6-3.8 GHz, and the like. Shared spectrum may also include Spectrum Access System (SAS) in 3.55-3.7 GHz and the like. Further applicable spectrum bands include IMT (International Mobile Telecommunications) spectrum, IMT-advanced spectrum, IMT-2020 spectrum, spectrum made available under FCC's "Spectrum Frontier" 5G initiative, etc.

In some exemplary implementations, the baseband circuitry 104 may include a pulse position modulator that selects one or more subcarriers to transmit at higher power levels to encode data. For example, the position in a frequency domain of a subcarrier that is transmitted at a high energy level may encode a set of data. In addition, the baseband circuitry 104 may include a pulse position demodulator that determines data transmitted through one or more higher power level subcarriers received at the baseband circuitry 104.

RF circuitry 106 may enable communication with wireless networks using modulated electromagnetic radiation through a non-solid medium. In various exemplary implementations, the RF circuitry 106 may include switches, filters, amplifiers, etc. to facilitate the communication with the wireless network. RF circuitry 106 may include a receive signal path which may include circuitry to down-convert RF signals received from the front end circuitry 108 and provide baseband signals to the baseband circuitry 104. RF circuitry 106 may also include a transmit signal path which may include circuitry to up-convert baseband signals provided by the baseband circuitry 104 and provide RF output signals to the front end circuitry 108 for transmission.

Front end circuitry 108 may include a receive signal path which may include circuitry configured to operate on RF signals received from one or more antennas 110, amplify the received signals and provide the amplified versions of the received signals to the RF circuitry 106 for further processing. Front end circuitry 108 may also include a transmit signal path which may include circuitry configured to amplify signals for transmission provided by the RF circuitry 106 for transmission by one or more of the one or more antennas 110.

In some exemplary implementations, the front end circuitry 108 may include a TX/RX switch to switch between transmit mode and receive mode operation. The front end circuitry 108 may include a receive signal path and a transmit signal path. The receive signal path of the front end circuitry 108 may include a low-noise amplifier (LNA) to amplify received RF signals and provide the amplified received RF signals as an output (e.g., to the RF circuitry 106). The transmit signal path of the front end circuitry 108 may include a power amplifier (PA) to amplify input RF signals (e.g., provided by RF circuitry 106), and one or more filters to generate RF signals for subsequent transmission (e.g., by one or more of the one or more antennas 110).

In some exemplary implementations, the wireless device 100 may include additional elements such as, for example, memory/storage, display, camera, sensor, and/or input/output (I/O) interface.

Figure 2:
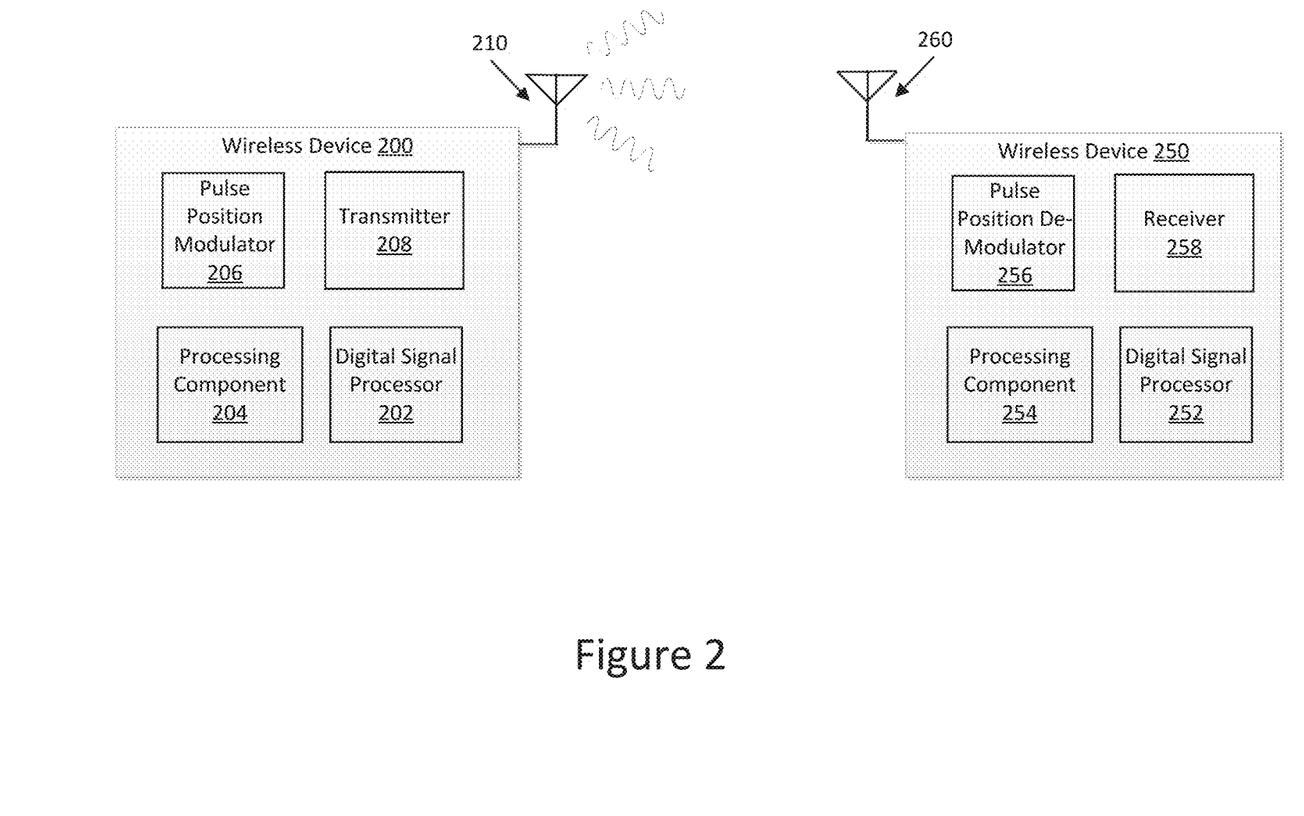
FIG. 2 is a block diagram illustrating exemplary components of an electronic device implementing aspects of the disclosure, according to an exemplary implementation.

FIG. 2 illustrates a block diagram of a portion of two wireless devices 200, 250 that may communicate using pulse position modulation in frequency domain, according to an exemplary implementation. The wireless devices 200, 250 may include a mobile device and a base station. For example, the wireless device 200 may be a mobile device that transmits data using a pulse position modulation encoding scheme, and the wireless device 250 may be a base station or other device that receives and demodulates signals transmitted by the wireless device 200. While described herein as having a wireless device 200 that transmits data using pulse position modulation in a frequency domain and a wireless device 250 that receives and demodulates data encoded with pulse position modulation, in some exemplary implementations, each wireless device 200, 250 may operate as a transmitter and a receiver.

The wireless device 200 may include a digital signal processor 202, a processing component 204, a pulse position modulator 206, a Transmitter 208, and an antenna 210. In an exemplary implementation, the pulse position modulator 206 may perform either or both of pulse positional modulation and pulse positional de-modulation. In an exemplary implementation, the pulse positional modulator 206 may perform modulation functionalities and another component, e.g., a pulse position de-modulator, may perform demodulation functionalities. The pulse positional modulator 206 may be implemented as part of a baseband module or a standalone component.

In various exemplary implementations, the digital signal processor 202 may be configured to process digital signals such as data encoding/decoding, data modulating/demodulating, data sampling, data error correcting, etc. In some exemplary implementations, the processing component 204 may be configured to control the processing, encoding, decoding, modulating, or demodulating of signals according to one exemplary implementation. In various exemplary implementations, the processing component 204 may be a central processing unit (CPU) and to control the overall operation of the mobile communication device. For example, the processing component 204 may process signals received from application circuitry or provide signals to application circuitry. In some exemplary implementations, the processing component 204 may also provide processing to work in conjunction with digital signal processor 202. The processing component 204 may be configured to control the processing, encoding, decoding, modulating, or demodulating of signals according to one exemplary implementation. In some exemplary implementations, the processing component 204 may be configured to control the signal generation and/or processing such as data encoding/decoding, data modulating/demodulating, data sampling, data error correcting, etc. The processing component 204 may further be configured to perform power management operations for one or more components of the baseband circuitry or the RF circuitry or other components of the mobile device.

In some exemplary implementation, the pulse position modulator 206 may be a component of, or a module executed by, the processing component 204. For example, the processing component 204 of wireless device 200 may be part of baseband circuitry 104 described above with reference to FIG. 1. In some exemplary implementations, one or more of the pulse position modulator 206, the processing component 204, and the digital signal processor 202 may be part of baseband circuitry 104 described with reference to FIG. 1. Furthermore, the digital signal processor 202, the processing component 204, or the pulse position modulator may be part of a single processing device, or may each be a separate processing component. For example, a processing component 204 may include particular hardware, software, or firmware elements that perform the functions of the pulse position modulator 206 or the digital signal processor 202.

The pulse position modulator 206 may determine how to encode data in a plurality of available subcarriers. The pulse position modulator 206 may encode the data by selecting a subcarrier from the plurality of subcarriers that corresponds to data to send. For instance, if there are a set number of subcarriers available to the wireless device 200, the pulse position modulator 206 may select one to transmit at a higher power level than the other subcarriers. The position of the selected subcarrier within the set number of subcarriers may convey one or more bits of data. For example, if there are 16 available subcarriers, each position within the subcarriers may indicate a different number between 0 and 15. Accordingly, by selecting one of the subcarriers to transmit at a higher power level, the pulse position modulator 206 may encode 4 bits of data in the transmission.

In some exemplary implementations, the pulse position modulator 206 may generate one or more Orthogonal Frequency Division Multiplexing (OFDM) symbols to be transmitted. The OFDM symbols may include N individual subcarriers. Among those N subcarriers, the pulse position modulator 206 may select at least one subcarrier, $0<=K_0<N$, is selected to transmit at a high power peak signal. The position of the selected subcarrier $K_0$ in the frequency domain corresponds to the data carried by the selected position. Thus, the amount of data that can be transmitted by selecting on subcarrier from N subcarriers is given as $\inf\{\log 2(N)\}$ bits.

In some exemplary implementations, the pulse position modulator 206 may select more than one subcarrier from a plurality of available subcarriers to transmit at a higher power level. For example, m subcarriers may be selected from N available subcarrier to transmit at a higher power level. There are $N!/(m!*(N-m)!)$ permutations possible to choose the m subcarriers from the N available subcarriers and thus $\inf\{\log 2(N!/(m!*(N-m)!))\}$ bits can be encoded into the selected positions.

In some exemplary implementations, the pulse position modulator 206 may select subcarriers to transmit at different power levels. For example, there may be a high power level, a medium power level, and a low power level. The additional available power levels may be used by the pulse position modulator 206 to encode additional information. For instance, medium power level subcarriers and higher power level subcarriers may be selected by the pulse position modulator 206 to encode different information, or to encode more bits.

In some exemplary implementations, the pulse position modulator 206 may determine a power level to transmit as the higher power level based on the regulations for average spectral power density. For instance, the pulse position modulator 206 may determine that a first power level may be used if a single subcarrier is selected to convey pulse position modulation data, and a second power level may be used if more than one subcarrier is selected to convey pulse position modulation data. Accordingly, the pulse position modulator may determine a power level that provides the best signal quality, while also staying within regulations. Thus, the pulse position modulator 206 may determine a threshold power level based on the regulations and the average spectral density required.

In some exemplary implementations, the subcarriers the data transmitted by the wireless device 200 may all be encoded in pulse position modulation as discussed above. In some exemplary implementations, the remaining subcarriers at the lower power level may be used to generate a OFDM symbol with N−1 subcarriers (or N−m subcarriers if multiple high power subcarriers are selected). These N−1 subcarriers (or N−m subcarriers) will carry a set of data $S_0, \ldots, S_{N-2}$. Thus, each of these subcarriers corresponds to a BPSK/QPSK/QAM or similar digital constellation point. With carrier $K_0$ being selected for the high power peak, the remaining OFDM data symbols, $S_0, \ldots, S_{N-2}$, will be allocated to OFDM subcarriers $0, \ldots, K_{0-1}, K_{0+1}, \ldots, N-1$. Another wireless device 250 may then detect the high power peak position, derive the bit sequence from the position of the detected peak and then decode the remaining OFDM subcarriers. In some exemplary implementations, pulse position modulation in the frequency domain may also be applied to other OFDM coding schemes such as SC-FDMA, SC-OFDM, filter bank-based multicarrier (FBMC), OFDMA, and the like, or 3GPP NR (New Radio) by allocating the OFDM carrier data bit vectors to the corresponding symbol resources.

In some exemplary implementations, the wireless device 200 may transmit different information with OFDM encoding and with pulse position modulation. For example, a first data stream may be selected to transmit with pulse position modulation, and a second data stream may be selected to transmit with OFDM encoding. In some exemplary implementations, the first data stream may include data at a higher priority than the second data stream. Thus, the pulse position modulation may be selected for the first data stream in order to provide the higher priority data at a higher quality of service. In some exemplary implementations, the first data stream and the second data stream may be related. For example, a first data stream may be basic level video to stream from the wireless device 200, while the second data stream may include additional information such as high definition video, audio, or other data that is at a lower priority than the basic video stream. In some exemplary implementations, the first data stream is associated with base information to be transmitted and second data stream is associated with accompanying information.

In one exemplary implementation, pulse position modulation in the frequency domain may be used with OFDM encoding to implement a split between user-plan and control-plane data. User data are modulated onto OFDM carriers based on the encoding scheme, and control data may be modulated based on the pulse position modulation in the frequency domain. This may provide increased performance of control plane data. In some exemplary implementations, some (or all) of the user data may be modulated based on pulse position modulation in the frequency domain. For example, critical and/or highly important (base) information or requiring a very low latency. In some exemplary implementations, low latency services are modulated based on pulse position modulation in the frequency domain while other services that are not as latency sensitive may be modulated onto the remaining carriers.

In order to encode multiple data streams into a transmitted symbol, the wireless device 200 may select a first set of bits from a first data stream of the plurality of data streams. The selected set of bits may be the next bits to be transmitted from the first data stream. The number of bits selected may be determined by the number of available subcarriers, and the number of subcarriers to be selected to transmit at a higher power level. In some exemplary implementations, the pulse position modulator 206 may determine a number of subcarriers to be selected to transmit at a higher power level based on the amount of data in the first data steam, a priority level of data in the first data stream, the current transmission quality, or other characteristics. For example, the pulse position modulator 206 may transmit fewer or additional subcarriers at a higher power level to increase the data that can be transmitted using pulse position modulation if there is a large amount of data or high data rate for the first data stream. The pulse position modulator 206 may then select one or more of a plurality of subcarriers to transmit at at a first power tier.

The wireless device 200 may then select a second set of bits from a second data stream of the plurality of data streams. For example, the processing component 204 or the digital signal processor 202 may modulate OFDM data symbols onto the remaining subcarriers. The selected set of bits may be the next bits to send from the second data stream. The number of bits selected may be determined by the number of available subcarriers. The second set of bits may be modulated on the remaining subcarriers using OFDM encoding. In some exemplary implementations, the wireless device 200 may comprise a memory or storage element, which may be configured to store or buffer a plurality of data streams comprising a plurality of bits. Based on values of the second set of bits, the processing component 204 may further be configured to select one of the subcarriers to be transmitted at a second power tier that is higher than the first power tier, and to generate a symbol to be transmitted comprising the plurality of subcarriers.

In some exemplary implementations, the antenna 210 may be configured to function as a transmitting antenna and/or a receiving antenna. According to one exemplary implementation, the antenna 210 may be configured to operatively couple to the transmitter 208 to transmit the one or more generated symbols comprising the plurality of subcarriers. For instance, the transmitter 208 may amplify or encode a symbol received from the pulse position modulator 206, processing component 204, or other component to transmit through antenna 210. For example, the transmitter 208 may be part of RF circuitry or front end circuitry of the wireless device 200.

The transmissions from the wireless device 200 may be received by a wireless device 250. The wireless device 250 may be a base station, a mobile device, or any other device with an antenna 260 and receive 258 for receiving data transmissions from the wireless device 200. The wireless device 250 may also include a digital signal processor 252, a processing component 254, and a pulse position demodulator 256. In some exemplary implementations, one or more of the digital signal processor 252, the processing component 254, and the pulse position demodulator 256 may be incorporated into a single processing unit. For example, in some exemplary implementations, one or more of the components may be part of baseband circuitry.

The digital signal processor 252 or pulse position demodulator 256 may receive a symbol from the receiver 258 and determine a subcarrier that was transmitted at a higher power tier than the other subcarriers. The pulse position demodulator 206 may then determine a set of bits that are represented by the position of the higher power tier subcarrier. As discussed above, in some exemplary implementations, there may be more than one subcarrier that was transmitted at a higher power tier. Accordingly, additional higher power subcarriers may be identified and the pulse position demodulator 206 may determine additional data based on the combination of the higher power subcarriers. In some exemplary implementations, additional power tiers may be identified and additional data may be extracted from the position of the different subcarriers at different power tiers.

In order to determine which subcarrier is transmitted at a higher power tier, the wireless device 250 may compare the power level of subcarriers to one another. For example, the wireless device 250 may determine a power level for each subcarrier and determine whether one of the subcarriers is at a higher power level based on a threshold. For example, a threshold to be considered at a higher power level may be determined based on a multiplier of the average power level of a subcarrier. In some exemplary implementations, the wireless device 250 may compare subcarriers within a coherence frequency to determine whether one of the subcarriers is at a higher power level compared to others that are transmitted with similar interference characteristics. In addition to determining data from the position of a higher power subcarrier, the processing component 254 or the digital signal processor 252 may demodulate the remaining subcarriers for OFDM data symbols to determine additional transmitted data. For example, a second data stream may be identified in the additional subcarriers.

Figure 3:
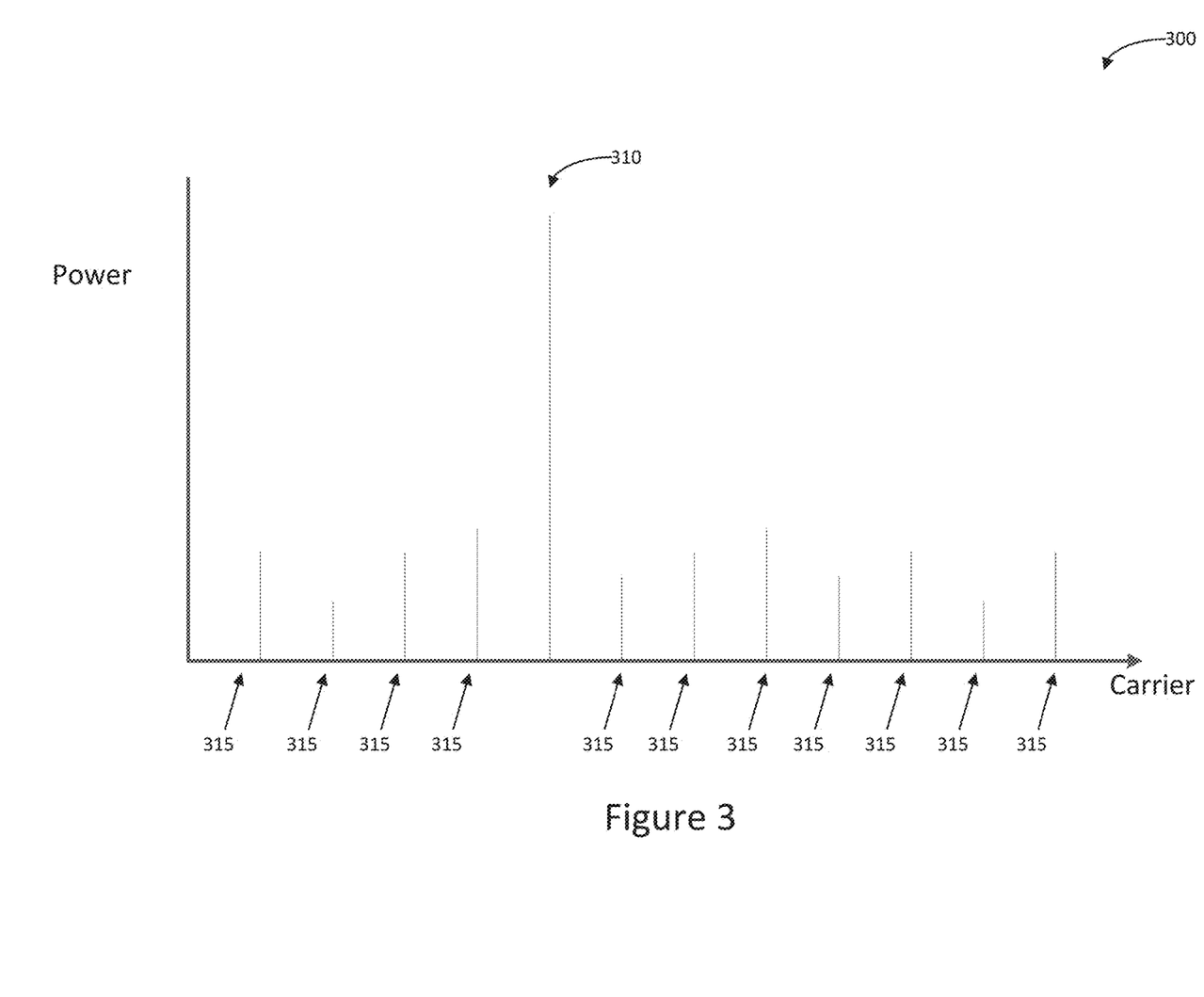
FIG. 3 is a diagram illustrating one subcarrier having a power tier that is higher than those of the remaining subcarriers, according to an exemplary implementation.

According to one exemplary implementation, FIG. 3 is a graph 300 of a set of subcarriers that can be used to transmit data using pulse position modulation in the frequency domain. The horizontal axis of the graph indicates positions in the frequency domain of a plurality of subcarriers. The vertical axis of the graph indicates the power level of the subcarriers. As shown in the graph 300 there are a number of subcarriers 315 to be transmitted at a first power tier and one subcarrier 310 is selected to be transmitted at a second power tier. The first power tier is lower than the second power tier in the graph 300. The position of the subcarrier 310 in the frequency domain may be used to transmit information as discussed above. For example, if there are 16 subcarriers available, and the subcarrier 310 is in position 5 of 16 as shown in FIG. 3, then the phase position modulation may indicate the set of data represented by '0101' to represent 5. The remaining subcarriers 315 may be used to transmit OFDM data symbols based on the phase and/or amplitude of the individual subcarriers. In some exemplary implementations, the higher power level subcarrier 310 may also be modulated at a particular phase to encode additional information.

Figure 4:
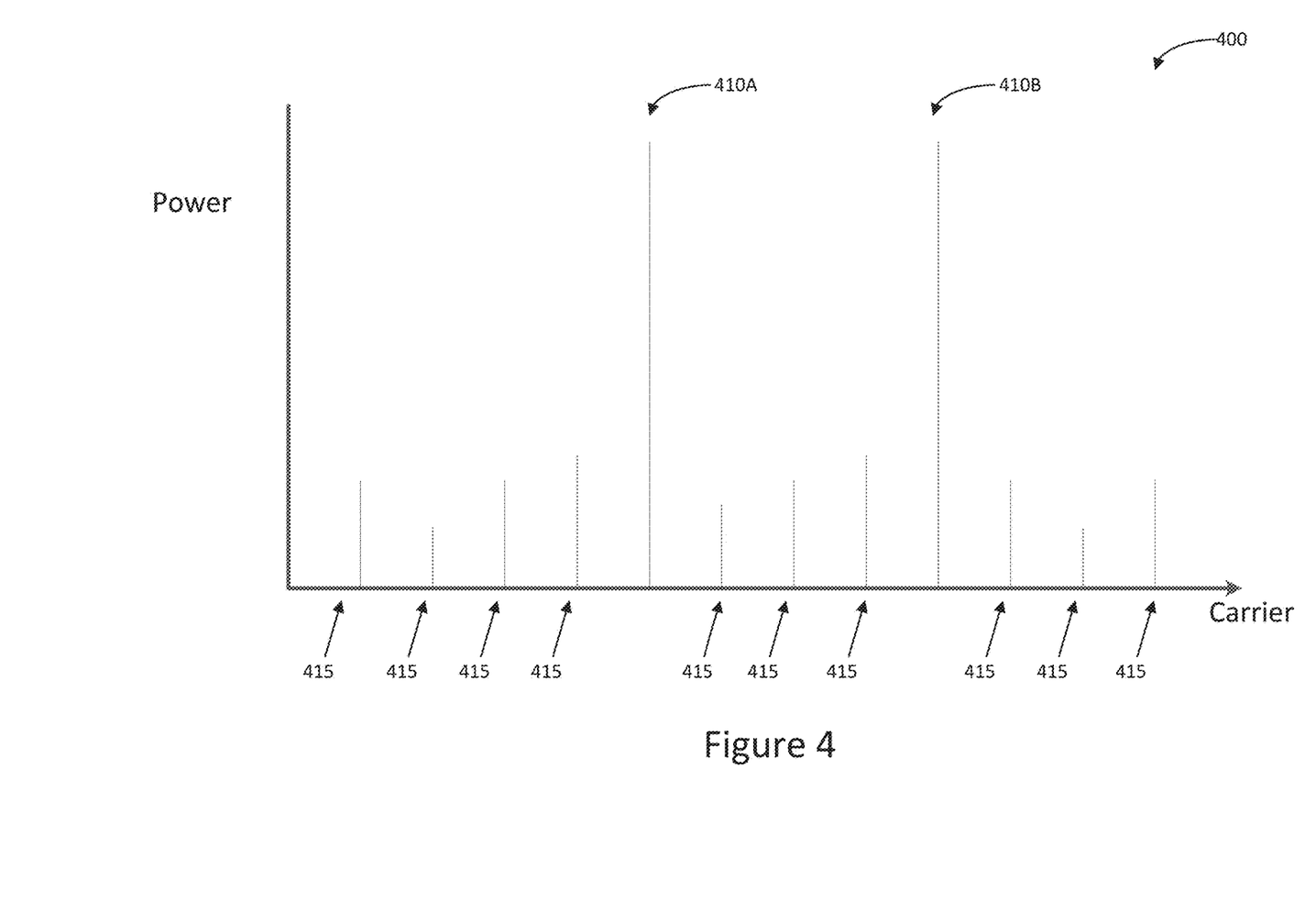
FIG. 4 is a diagram illustrating two subcarriers having power tiers that are equivalent or equal to each other, but are higher than those of the remaining subcarriers, according to an exemplary implementation.

According to one exemplary implementation, FIG. 4 is a graph 400 of a set of subcarriers that can be used to transmit data using pulse position modulation in the frequency domain. The horizontal axis of the graph indicates positions in the frequency domain of a plurality of subcarriers. The vertical axis of the graph indicates the power level of the subcarriers. As shown in the graph 400 there are a number of subcarriers 415 to be transmitted at a first power tier and two subcarriers 410A and 410B selected to be transmitted at a second power tier. The first power tier is lower than the second power tier in the graph 400.

The position of the subcarriers 410A and 410B in the frequency domain may be used to transmit information as discussed above. For example, if there are 16 subcarriers available, and the subcarrier 410A is in position 5 of 16 and the subcarrier 410B is in position 9 of 16 as shown in FIG. 3, then the phase position modulation may indicate a set of data based on the positions. As discussed above, if m subcarriers are selected from N available subcarriers, then the number of possible permutations is given by $N!/(m!*(N-m)!)$, and the amount of data that can be transmitted is given as $\inf\{\log 2(N!/(m!*(N-m)!))\}$ bits. Thus for the example of selecting 2 subcarriers from 16 available subcarriers, the amount of data that can be transmitted is 6 bits. A pulse position modulator may access a table to determine subcarriers to select to encode a particular set of bits. Furthermore, a pulse position demodulator may access a table to determine bits that are encoded in a set of subcarriers based on the power tiers of the subcarriers. The remaining subcarriers 415 may be used to transmit OFDM data symbols based on the phase and/or amplitude of the individual subcarriers. In some exemplary implementations, the higher power level subcarriers 410A and 410B may also be modulated at a particular phase to encode additional information.

Figure 5:
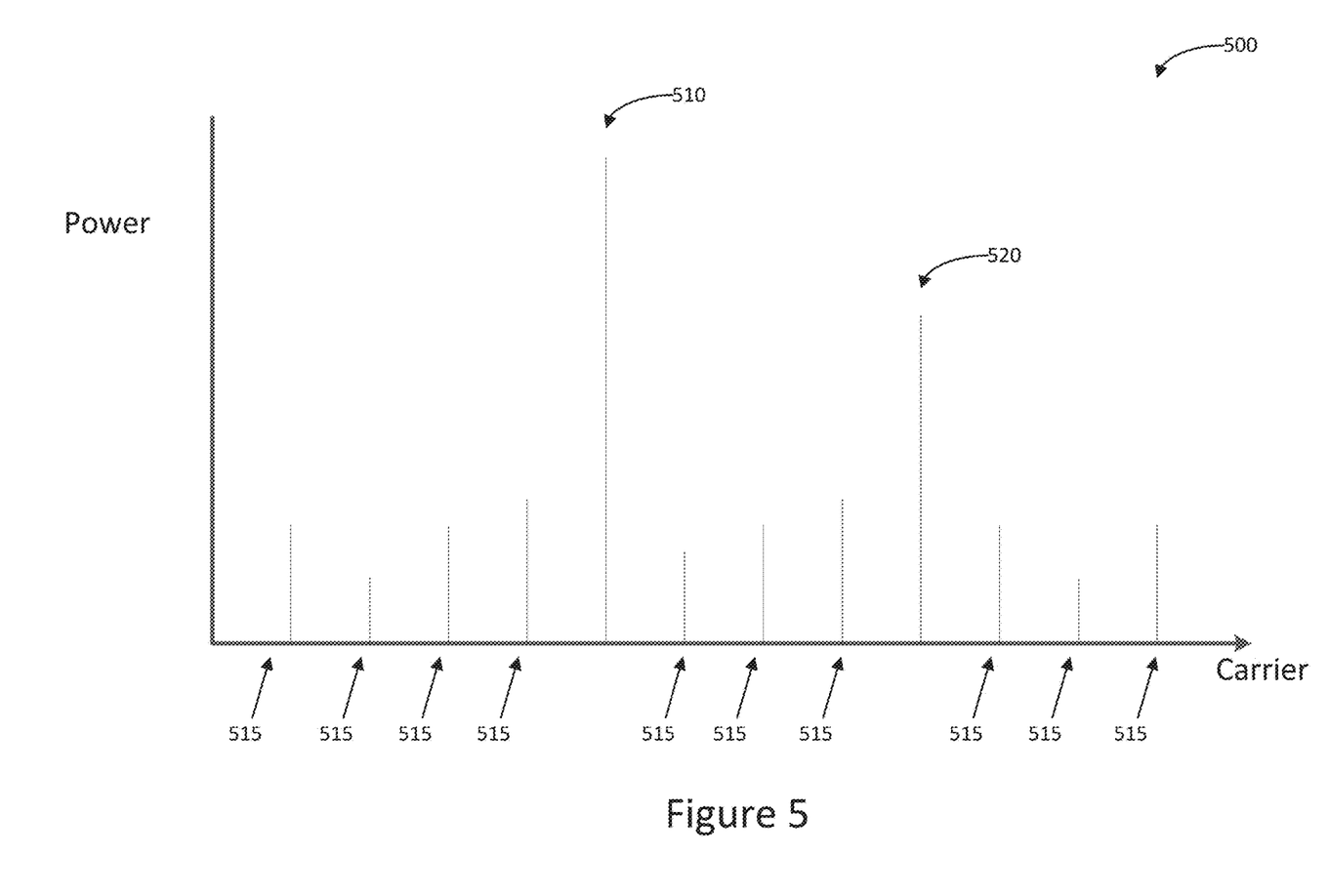
FIG. 5 is a diagram illustrating two subcarriers having power tiers that are not equivalent or equal to each other, but are higher than those of the remaining subcarriers, according to an exemplary implementation.

FIG. 5 depicts a graph 500 showing two subcarriers 510 and 520 having power levels that are higher than the rest of the N−2 subcarriers 515. The power levels of the two subcarriers 510 and 520 may also be different than each other. For example, in graph 500 the power level of the subcarrier 510 is higher than that of the subcarrier 520. The different power levels of the subcarriers 510 and 520 may be used to convey additional data bits during the transmission. For example, the power level may be used to increase the amount of data transmitted. In an exemplary implementation, the different power levels may be used to convey different data streams. For example, a first data stream may be encoded by subcarriers having the power level of the subcarrier 510, a second data stream may be encoded by subcarriers having the power level of the subcarrier 520, and a third data stream may be encoded in the phase modulation of the remaining subcarriers 515. In some exemplary implementations, additional power levels may be used to transmit additional data. For example, there may be N power hierarchical tiers, wherein the first power tier is lower than the second power tier, which is lower than the third power tier, which is lower than the fourth power tier, and so on, where the $(N-1)^{th}$ power tier is lower than the $N^{th}$ power tier.

Figure 6:
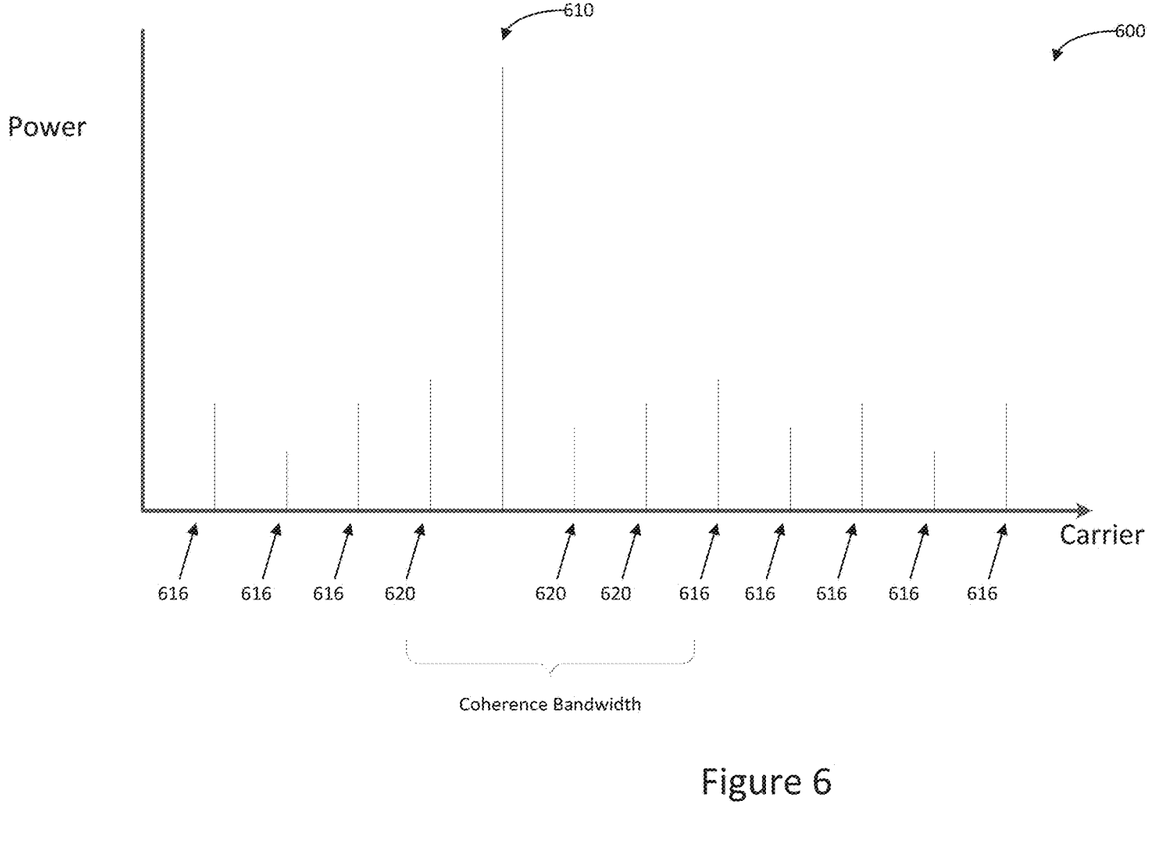
FIG. 6 is a diagram illustrating a subcarrier having power tier that is higher than those of the remaining subcarriers, according to an exemplary implementation.

FIG. 6 is a graph 600 showing power levels of subcarriers in the frequency domain as received by a wireless device. As shown in the graph, there is one subcarrier 610 at a higher power level and a number of remaining subcarriers 616 and 620 that are at a lower power level. Of the remaining subcarriers, a first set 616 are not within the coherence bandwidth of the higher power level subcarrier 610, and a second set 620 are within the coherence bandwidth of the higher power subcarrier. In order to determine which subcarriers are at a higher power level, the pulse position demodulator may compare power levels of subcarriers within coherence bandwidths. Accordingly, the power levels of the compared subcarriers are expected to be affected in approximately the same amount based on the transmission path characteristics. Thus, the pulse position demodulator may compare the power levels of the higher power subcarrier 610 to the second set 620 of subcarriers in the coherence bandwidth. The remaining subcarriers 616 may similarly be compared to one another within coherence bandwidths to determine other higher power level subcarriers. In some exemplary implementations, subcarriers may be compared to one another in other sets than the coherence bandwidth, may be compared based on a sliding window, may all be compared together, or may be compared using other techniques.

Figure 7:
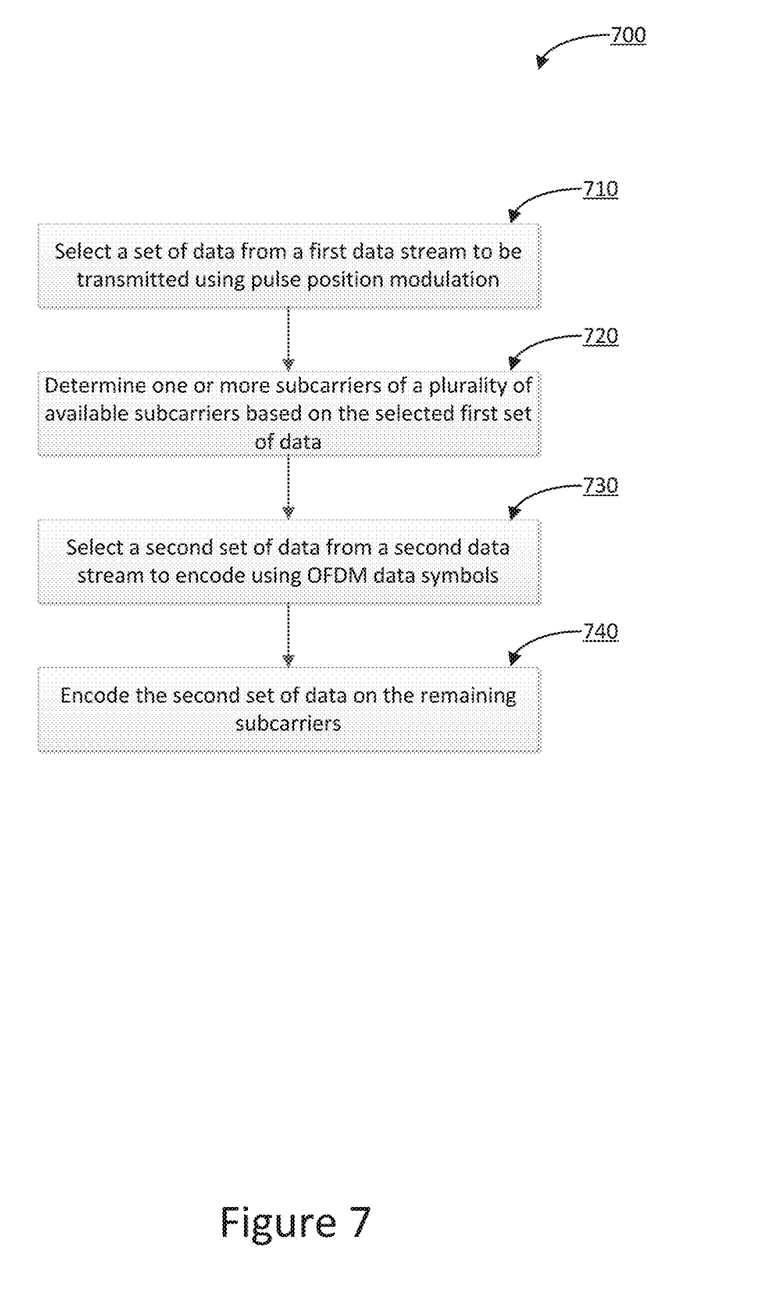
FIG. 7 illustrates a flowchart of an example method of utilizing a power hierarchical phase position modulation to encode data, according to an exemplary implementation.

FIG. 7 illustrates a flowchart of an example method 700 of utilizing the above-mentioned pulse position modulation to generate an OFDM symbol comprising a plurality of subcarriers for transmission, according to an exemplary implementation. Beginning with block 710, a processing component may select a first set of data from a first data stream to be transmitted using pulse position modulation. The first set of data may be selected based on the amount of data that can be transmitted in a symbol using pulse position modulation. For example, if n bits can be transmitted using pulse position modulation in a symbol, then the processing component may select n bits from the first data stream to be encoded using pulse position modulation.

In block 720, the processing component may determine one or more subcarriers to transmit at a higher power level based on the selected set of data. For example, the processing component may determine that transmitting a particular subcarrier at a higher power level may encode the selected data onto the symbol to be transmitted. The processing component may determine which subcarrier or subcarriers to transmit at a higher power level based on accessing a data store or look up table with a mapping of subcarriers to data, or based on a mathematical operation that dynamically identifies subcarriers. For instance, a subcarrier in a position that is the same as a number representing the data to be transmitted may be selected by the processing component. In some exemplary implementations, the processing component may cause a symbol to be generated that has the one or more subcarriers at a higher power level based on the selected subcarriers.

In block 730, the processing component may select a second set of data from a second data stream to encode using OFDM data symbols. For example, the second set of data may be selected based on the number of remaining subcarriers and the amount of data that can be transmitted over that number of subcarriers.

In block 740, the processing component may encode the second set of data using phase and/or amplitude modulation for the remaining subcarrier based on the second set of data to be transmitted. The processing component may then generate a symbol for transmission based on the phase and/or amplitude modulation of the remaining subcarriers and the selected subcarriers to be transmitted at the higher power level.

Figure 8:
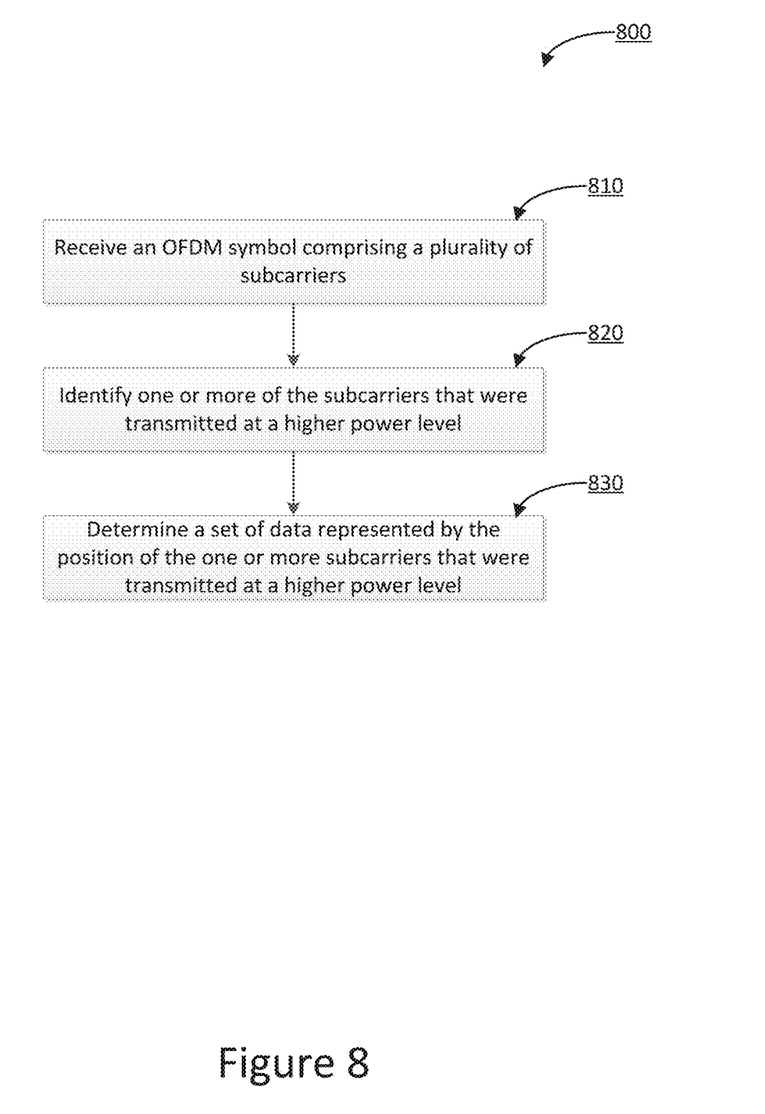
FIG. 8 illustrates a flowchart of an example method of decoding a power hierarchical phase position modulation signal, according to an exemplary implementation.

FIG. 8 is a flowchart of an example method 800 of receiving an OFDM symbol comprising a plurality of subcarriers generated based on the above-mentioned pulse position modulation, according to an exemplary implementation. Beginning with block 810, a processing component may receive an OFDM symbol through an antenna operatively coupled to a receiver. For instance the receiver may include RF circuitry, front end circuitry or the like. The received symbol may include a plurality of subcarriers having data modulated using pulsed position modulation as discussed above.

In block 820, a processing component may determine one or more subcarriers that were transmitted at a higher power level than the remaining subcarriers. For example, the power level of the subcarriers may be compared to one another to determine which of the subcarriers have a higher power level. In some exemplary implementations, the higher power levels may be determined by comparing the subcarriers that are adjacent to one another, or grouped according to some criteria such as a coherence bandwidth.

In block 830, the processing component may determine a set of data represented by the position of the one or more subcarriers at a higher power level. For example, the processing component may perform a mathematical transformation of the positions that are at a higher power level dynamically. In some exemplary implementations, the processing component may access a data store or look up table to determine data that is represented by the position of the subcarriers that are transmitted at a higher power level. In some exemplary implementations, the processing component may also decode the plurality of remaining subcarriers to determine data transmitted by OFDM data symbols encoded in the phase an amplitude modulation of the subcarriers.

The following examples pertain to further exemplary implementations of the disclosure.

Example 1 is an apparatus for encoding data for transmit by a wireless device comprising: a transmitter for transmitting a first data stream; and a processing component operatively coupled to the receiver, the processing component to: identify a first set of data of the first data stream to be transmitted by the wireless device; select one or more subcarriers of a plurality of available subcarriers based on the first set of data to be transmitted; generate a symbol to be transmitted comprising the one or more subcarriers at a first power level and a remaining set of subcarriers at a second power level.

In example 2, in the apparatus of example 1, the processing component is further to: identify a second set of data of a second data stream to be transmitted by the wireless device; and encode the second set of data on a second set of subcarriers.

In example 3, in the apparatus of example 1, to select the one or more subcarriers of a plurality of available subcarriers the processing component is further to: identify a first subcarrier corresponding to a first portion of the first set of data; and identify a second subcarrier corresponding to a second portion of the first set of data.

In example 4, in the apparatus of example 1, the processing component is further to: identify a second set of data from a second data stream; and determine a second subcarrier of the plurality of available subcarriers to transmit at a third power level to represent the second set of data.

In example 5, in the apparatus of example 1, the first power level is higher than the second power level.

In example 6, in the apparatus of example 1, the processing component is further to: determine a maximum average power density of the plurality of available subcarriers; and identify the first power level based on a threshold of the maximum average power density.

Example 7 is a system comprising: a transmitter for transmitting data; and a processing component operatively coupled to the transmitter, the processing component to: identify a first set of data to be transmitted at a first quality of service; select a first subcarrier of a plurality of available subcarriers that corresponds to the first set of data to be transmitted; identify a second set of data to be transmitted at a second quality of service; generate representations of the second set of data on a remaining set of subcarriers of the plurality of available subcarriers; and generate a symbol to be transmitted having the set of subcarriers at a first power level and the first subcarrier at a second power level.

In example 8, in the system of example 7, the processing component is further to: identify a third set of data to be transmitted at the first quality of service; and select a second subcarrier of the plurality of available subcarriers that corresponds to the third set of data, wherein to generate the symbol, the processing component is to further generate the symbol to be transmitted having the second subcarrier at the first power level.

In example 9, in the system of example 7, the processing component is further to: identify a third set of data to be transmitted at a third quality of service; and select a second subcarrier of the plurality of available subcarriers that corresponds to the third set of data, wherein to generate the symbol, the processing component is to further generate the symbol to be transmitted having the second subcarrier at a third power level.

In example 10, in the system of example 7, the first power level is higher than the second power level.

In example 11, in the system of example 7, the processing component is further to: determine a maximum average power density of the plurality of available subcarriers; and identify the first power level based on a threshold of the maximum average power density.

In example 12, in the system of example 7, to identify the first set of data to be transmitted at the first quality of service, the processing component is further to: determine that the first set of data is associated with base information of a transmission; and determine that the second set of data is associated with accompanying information.

Example 13 is an apparatus for demodulating signals received by a wireless device comprising: a receiver for receiving data; and a processing component operatively coupled to the receiver, the processing component to: process a received signal having a plurality of subcarriers of a transmission; identify a first subcarrier having a first power level and a second subcarrier having a second power level; and determine a first set of data based at least in part on a first position of the first subcarrier within the plurality of subcarriers of the transmission.

In example 14, in the apparatus of example 13, the processing component is further to: identify a third subcarrier having a third power level; and determine a second set of data corresponding to a second position of the third subcarrier within the plurality of subcarriers of the transmission.

In example 15, in the apparatus of example 13, the processing component is further to: identify a third subcarrier having the first power level; and determine a second position of the third subcarrier within the plurality of subcarriers of the transmission, wherein to determine the first set of data, the processing component is further to determine a set of data represented by the first position and the second position.

In example 16, in the apparatus of example 13, to identify the first signal and the second signal, the processing component is to: determine that the first subcarrier and the second subcarrier are within a coherence bandwidth of the transmission; and compare the power level of the first signal and the second signal.

In example 17, in the apparatus of example 13, the first power level is a higher power level than the second power level.

In example 18, in the apparatus of example 13, the processing component is further to, for each subcarrier of the plurality of subcarriers: identify a subset of subcarriers within a coherence bandwidth of the subcarrier; and determine a power level of the subcarrier and an average power level of the subset of subcarriers; and determine whether the power level of the subcarrier satisfies a threshold based on the average power level of the subset of subcarriers.

In example 19, in the apparatus of example 18, the processing component is further to, in response to determining that the power level of the subcarrier satisfies the threshold, identify a set of data corresponding to a second position of the subcarrier.

In example 20, the apparatus of example 13, further comprises: radio frequency (RF) circuitry coupled to the processing component; and an antenna coupled to the RF circuitry receive the signal.

Example 21 is a method comprising: identifying, by a processing device, a first set of data of a first data stream to be transmitted by the wireless device; selecting, by the processing device, one or more subcarriers of a plurality of available subcarriers based on the first set of data to be transmitted; generating, by the processing device, a symbol to be transmitted comprising the one or more subcarriers at a first power level and a remaining set of subcarriers at a second power level.

In example 22, the method of example 21 further comprises: identifying a second set of data of a second data stream to be transmitted by the wireless device; and encoding the second set of data on a second set of subcarriers.

In example 23, in the method of example 21, selecting the one or more subcarriers of a plurality of available subcarriers further comprises: identifying a first subcarrier corresponding to a first portion of the first set of data; and identifying a second subcarrier corresponding to a second portion of the first set of data.

In example 24, the method of example 21, further comprises: identifying a second set of data from a second data stream; and determining a second subcarrier of the plurality of available subcarriers to transmit at a third power level to represent the second set of data.

In example 25, in the method of example 21, the first power level is higher than the second power level.

In example 26, the method of example 21, further comprises: determining a maximum average power density of the plurality of available subcarriers; and identifying the first power level based on a threshold of the maximum average power density.

Example 27 is an apparatus comprising means to perform a method as claimed in any of claims 21 to 26.

Example 28 is a machine-readable storage including machine-instructions that, when executed, cause an apparatus to perform a method as claimed in any of claims 21 to 26.

Example 29 is an apparatus comprising: means for identifying a first set of data to be transmitted by a wireless device; and means for encoding the first set of data based on transmitting a first subcarrier of a plurality of subcarriers at a first power level and a second subcarrier of the plurality of subcarriers at a second power level.

In example 30, the apparatus of example 29 further comprises means for encoding a second set of data in a subset of the plurality of subcarriers other than the first subcarrier.

In example 31, the apparatus of example 29 further comprises means for encoding a second set of data based on transmitting a third subcarrier at a third power level.

In example 32, the apparatus of example 29 further comprises means for selecting the first subcarrier based on the position of the first subcarrier with respect to the plurality of subcarriers in a frequency domain.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Instructions used to program logic to perform exemplary implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one exemplary implementation, refers to the hardware, which is specifically configured to recognize and/or execute the code to be held on a non-transitory medium. Furthermore, in another exemplary implementation, use of a module refers to the non-transitory medium including the code, which is specifically adapted to be executed by the microcontroller to perform predetermined operations. And as can be inferred, in yet another exemplary implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one exemplary implementation, use of the term logic includes hardware, such as transistors, registers, or other hardware, such as programmable logic devices.

Use of the phrase 'configured to,' in one exemplary implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one exemplary implementation, refers to some apparatus, logic, hardware, and/or element designed in such a way to enable use of the apparatus, logic, hardware, and/or element in a specified manner. Note as above that use of to, capable to, or operable to, in one exemplary implementation, refers to the latent state of an apparatus, logic, hardware, and/or element, where the apparatus, logic, hardware, and/or element is not operating but is designed in such a manner to enable use of an apparatus in a specified manner.

The exemplary implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Reference throughout this specification to "one exemplary implementation" or "an exemplary implementation" means that a particular feature, structure, or characteristic described in connection with the exemplary implementation is included in at least one exemplary implementation of the present disclosure. Thus, the appearances of the phrases "in one exemplary implementation" or "in an exemplary implementation" on "in some exemplary implementations" in various places throughout this specification are not necessarily all referring to the same exemplary implementation. Furthermore, the particular features, structures, or characteristics may be combined in any suitable manner in one or more exemplary implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of exemplary implementation and other exemplarily language does not necessarily refer to the same exemplary implementation or the same example, but may refer to different and distinct exemplary implementations, as well as potentially the same exemplary implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "receiving," "determining," "generating," "measuring," "calculating," "setting," "identifying," "executing," "transmitting," "communicating," "accessing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc. as used herein are meant as labels to distinguish among different elements and may not necessarily have an ordinal meaning according to their numerical designation.

What is claimed is:

1. An apparatus comprising:
a transmitter; and
a processing component operatively coupled to the transmitter, the processing component to:
identify a first set of data of a first data stream to be transmitted by the transmitter;
select one or more subcarriers of a plurality of available subcarriers based on the first set of data to be transmitted;
generate a symbol to be transmitted comprising the one or more subcarriers at a first power level and a remaining set of subcarriers at a second power level;
identify a second set of data from a second data stream; and
determine a second subcarrier of the plurality of available subcarriers to transmit at a third power level to represent the second set of data.

2. The apparatus of claim 1, wherein the processing component is further to:
identify a second set of data of a second data stream to be transmitted by the transmitter; and
encode the second set of data on a second set of subcarriers.

3. The apparatus of claim 1, wherein the first power level is higher than the second power level.

4. The apparatus of claim 1, wherein the processing component is further to:
determine a maximum average power density of the plurality of available subcarriers; and
identify the first power level based on a threshold of the maximum average power density.

5. An apparatus comprising:
a transmitter; and
a processing component operatively coupled to the transmitter, the processing component to:
identify a first set of data of a first data stream to be transmitted by the transmitter;
select one or more subcarriers of a plurality of available subcarriers based on the first set of data to be transmitted; and
generate a symbol to be transmitted comprising the one or more subcarriers at a first power level and a remaining set of subcarriers at a second power level, wherein to select the one or more subcarriers of a plurality of available subcarriers the processing component is further to:
identify a first subcarrier corresponding to a first portion of the first set of data; and
identify a second subcarrier corresponding to a second portion of the first set of data.

6. A system comprising:
a transmitter; and
a processing component operatively coupled to the transmitter, the processing component to:
identify a first set of data to be transmitted at a first quality of service;
select a first subcarrier of a plurality of available subcarriers that corresponds to the first set of data to be transmitted;
identify a second set of data to be transmitted at a second quality of service;
generate representations of the second set of data on a remaining set of subcarriers of the plurality of available subcarriers;
generate a symbol to be transmitted having the set of subcarriers at a first power level and the first subcarrier at a second power level;
determine a maximum average power density of the plurality of available subcarriers; and
identify the first power level based on a threshold of the maximum average power density.

7. The system of claim 6, wherein the processing component is further to:

identify a third set of data to be transmitted at the first quality of service; and select a second subcarrier of the plurality of available subcarriers that corresponds to the third set of data, wherein to generate the symbol, the processing component is to further generate the symbol to be transmitted having the second subcarrier at the first power level.

8. The system of claim 6, wherein the first power level is higher than the second power level.

9. The system of claim 6, wherein to identify the first set of data to be transmitted at the first quality of service, the processing component is further to:

determine that the first set of data is associated with base information of a transmission; and determine that the second set of data is associated with accompanying information.

10. A system comprising:

a transmitter; and a processing component operatively coupled to the transmitter, the processing component to:

identify a first set of data to be transmitted at a first quality of service;

select a first subcarrier of a plurality of available subcarriers that corresponds to the first set of data to be transmitted;

identify a second set of data to be transmitted at a second quality of service;

generate representations of the second set of data on a remaining set of subcarriers of the plurality of available subcarriers; and generate a symbol to be transmitted having the set of subcarriers at a first power level and the first subcarrier at a second power level;

identify a third set of data to be transmitted at a third quality of service; and select a second subcarrier of the plurality of available subcarriers that corresponds to the third set of data, wherein to generate the symbol, the processing component is to further generate the symbol to be transmitted having the second subcarrier at a third power level.

11. A method comprising:

identifying, by a processing device, a first set of data of a first data stream to be transmitted;

selecting, by the processing device, one or more subcarriers of a plurality of available subcarriers based on the first set of data to be transmitted; and generating, by the processing device, a symbol to be transmitted comprising the one or more subcarriers at a first power level and a remaining set of subcarriers at a second power level, wherein selecting the one or more subcarriers of a plurality of available subcarriers further comprises:

identifying a first subcarrier corresponding to a first portion of the first set of data; and identifying a second subcarrier corresponding to a second portion of the first set of data.

12. The method of claim 11, further comprising identifying a second set of data of a second data stream to be transmitted by the transmitter; and encoding the second set of data on a second set of subcarriers.

13. The method of claim 11, further comprising:

identifying a second set of data from a second data stream; and determining a second subcarrier of the plurality of available subcarriers to transmit at a third power level to represent the second set of data.

14. The method of claim 11, wherein the first power level is higher than the second power level.

15. The method of claim 11, further comprising:

determining a maximum average power density of the plurality of available subcarriers; and identifying the first power level based on a threshold of the maximum average power density.

* * * * *